(12) United States Patent
Sun et al.

(10) Patent No.: US 9,300,340 B2
(45) Date of Patent: Mar. 29, 2016

(54) COMMUNICATION TERMINAL COMPATIBLE WITH MULTIPLE SMART CARDS

(71) Applicant: HUIZHOU TCL MOBILE COMMUNICATION CO., LTD., Huizhou, Guangdong (CN)

(72) Inventors: Li Sun, Huizhou (CN); Jinping Wei, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 0 days.

(21) Appl. No.: 14/404,105

(22) PCT Filed: Aug. 12, 2013

(86) PCT No.: PCT/CN2013/081249
§ 371 (c)(1),
(2) Date: Nov. 26, 2014

(87) PCT Pub. No.: WO2014/146390
PCT Pub. Date: Sep. 25, 2014

(65) Prior Publication Data
US 2015/0141077 A1    May 21, 2015

(30) Foreign Application Priority Data
Mar. 22, 2013  (CN) .......................... 2013 1 0094051

(51) Int. Cl.
*H04M 1/00*     (2006.01)
*H04B 1/38*     (2015.01)
(Continued)

(52) U.S. Cl.
CPC .......... *H04B 1/3816* (2013.01); *H04M 2250/14* (2013.01)

(58) Field of Classification Search
CPC ............. G06K 7/0056; G06K 13/0825; G06K 19/07741; G06K 7/01; H04B 1/3816; H04M 1/02
See application file for complete search history.

(56) References Cited

U.S. PATENT DOCUMENTS

2007/0173124 A1*  7/2007  Lin ...................... H04B 1/3816
439/630

(Continued)

FOREIGN PATENT DOCUMENTS

| CN | 101944670 A | 1/2011 |
| CN | 202084730 U | 12/2011 |

(Continued)

OTHER PUBLICATIONS

International Search Report dated Nov. 13, 2013; PCT/CN2013/081249.

*Primary Examiner* — Tammy Pham
*Assistant Examiner* — Frantz Bataille
(74) *Attorney, Agent, or Firm* — Lada & Parry LLP

(57) ABSTRACT

A communication terminal compatible with multiple smart cards includes a socket for inserting a standard smart card and a chassis for making the socket fitting at least one of small and ultra-small types of smart cards. The small smart card and the ultra small smart card insert into the socket through the chassis. The present communication terminal proposes a mobile terminal compatible with 3FF and/or 4FF card because of the arrangement of the correspondent chassis in the case that it only arranges 2FF card socket.

16 Claims, 5 Drawing Sheets

(51) Int. Cl.
*H01R 13/62* (2006.01)
*H01R 24/00* (2011.01)
*H04B 1/3816* (2015.01)

(56) References Cited

U.S. PATENT DOCUMENTS

2008/0119229 A1* 5/2008 Lee .................... H04B 1/3816
455/558
2008/0124964 A1* 5/2008 Chen .................... H04B 1/3816
439/326
2009/0172279 A1 7/2009 Yuan et al.
2012/0258630 A1* 10/2012 Takao .............. G06K 19/07739
439/631

FOREIGN PATENT DOCUMENTS

CN 202385150 U 8/2012
CN 103167073 A 6/2013

* cited by examiner

COMMUNICATION TERMINAL COMPATIBLE WITH MULTIPLE SMART CARDS

CROSS REFERENCE TO RELATED APPLICATION

This application claims the priority of International Application No. PCT/CN2013/081249, filed on Aug. 12, 2013, which claims priority to Chinese Application No. 201310094051.0, filed on Mar. 22, 2013. The entire disclosures of each of the above applications are incorporated herein by reference.

BACKGROUND OF THE INVENTION

1. Field of the Invention

The present relates to a communication terminal field, more particularly, to a communication terminal compatible with a plurality of smart cards.

2. Description of the Prior Art

Nowadays, various Subscriber Identity Module (SIM) cards, such as 2FF, 3FF and 4FF cards, present in our market. 2FF card, the abbreviation for second Form Factor SIM card or called standard smart card, is the physical form of popular traditional SIM card. 2FF card is Plug-In card in standard. 3FF card, the abbreviation for Third Form Factor SIM card or called small smart card, is smaller than normal Plug-In card in the card international standard discussion in 2006. 4FF card, the abbreviation for Fourth Form Factor SIM card or called ultra small smart card, is smaller than 3FF card. A communication terminal in the prior art only supports one single SIM card type.

SUMMARY OF THE INVENTION

Owing to the technical problem in the prior art, the present invention provides a communication terminal compatible with a plurality of smart cards to achieve a communication terminal capable of being compatible with a plurality of SIM cards.

According to the present invention, a communication terminal compatible with a plurality of smart cards, comprises:

a socket for inserting a standard smart card, the socket comprising a main body and a shell; and a chassis for making the socket fitting at least one of small and ultra-small types of smart cards, the small smart card and the ultra small smart card inserting into the socket through the chassis, the chassis comprising:

a card slot for making the socket fitting the small smart card and the ultra small smart card;

wherein the main body comprises:

a groove for inserting the standard smart card and the chassis; and a transmission mechanism for inserting or ejecting the standard smart card and the chassis.

According to the present invention, a communication terminal compatible with a plurality of smart cards, comprises:

a socket for inserting as standard smart card; and a chassis for making the socket fitting at least one of small and ultra-small types of smart cards, wherein the small smart card and the ultra small smart card insert into the socket through the chassis.

The present invention provides a communication terminal compatible with a plurality of smart cards that a mobile terminal is compatible with 3FF and/or 4FF card because of the arrangement of the suitable chassis in the case that it only arranges 2FF card socket.

BRIEF DESCRIPTION OF THE DRAWINGS

FIG. 5 is a schematic diagram that the communication terminal compatible with the plurality of smart cards in the present invention before the chassis plugs in;

FIG. 6 is a schematic diagram that the communication terminal compatible with the plurality of smart cards in the present invention in the process that the chassis plugs in;

DETAILED DESCRIPTION OF THE PREFERRED EMBODIMENT

Figure 1:
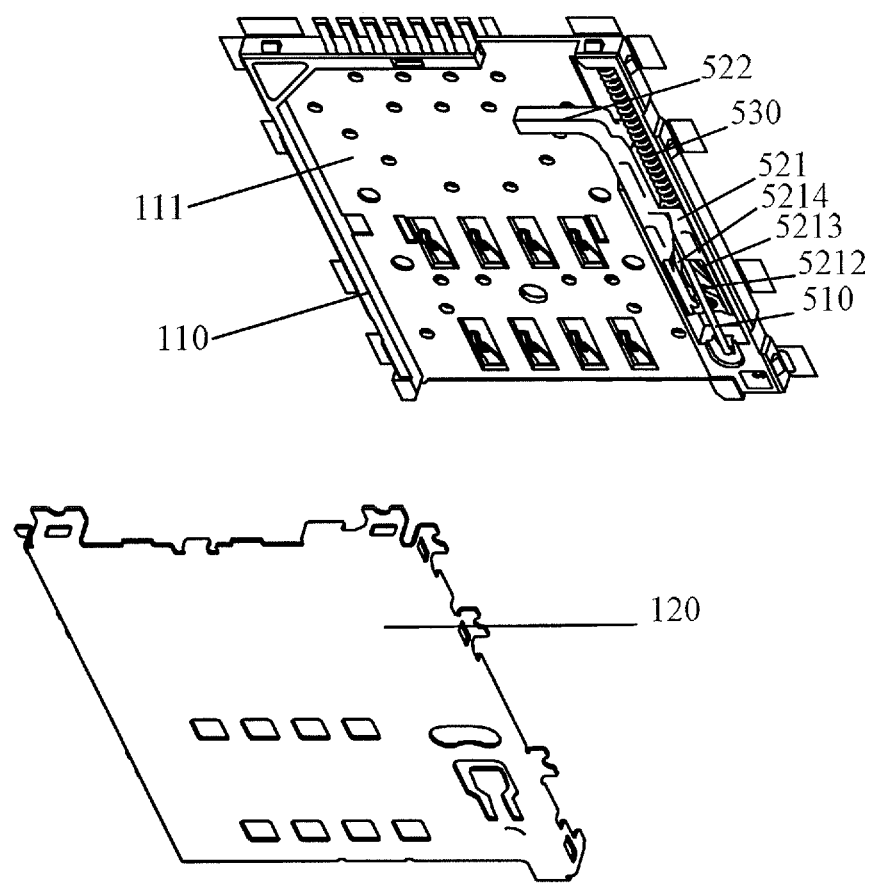
FIG. 1 is an exploded view that a main body and a shell on a socket in a communication terminal compatible with a plurality of smart cards in the present invention.

In order to illustrate the technique and effects of the present invention, a detailed description will be disclosed by the following disclosure in conjunction with figures. It is noted that the same components are labeled by the same number.

An embodiment provides a communication terminal compatible with a plurality of smart cards, and the communication terminal comprises but is not limited to a mobile phone, a tablet computer or a personal digital assistant, etc. The communication terminal comprises a socket 100 (refer to FIG. 1 and FIG. 2) and a chassis 200 (refer to FIG. 3 and FIG. 4). The socket 100 is used for inserting a SIM card, and a size of the socket 100 in the present invention fits for 2FF card. The chassis 200 is used for the socket 100 being compatible with a card smaller than the 2FF card, such as 3FF card 300 and 4FF card 400. The shape of the socket 200 is identical with that of the 2FF card, and the socket 200 arranges a card slot 111 for inserting a 3FF and/or 4FF card.

Figure 3:
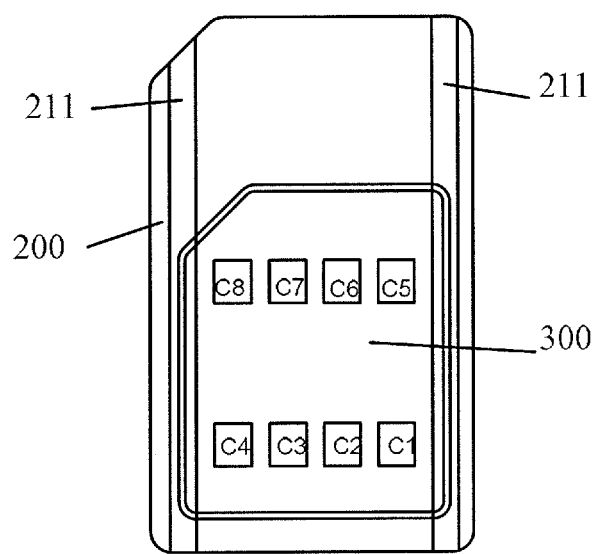
FIG. 3 is an assembly diagram that 3FF card and suitable chassis in the communication terminal compatible with the plurality of smart cards in the present invention.
Figure 4:
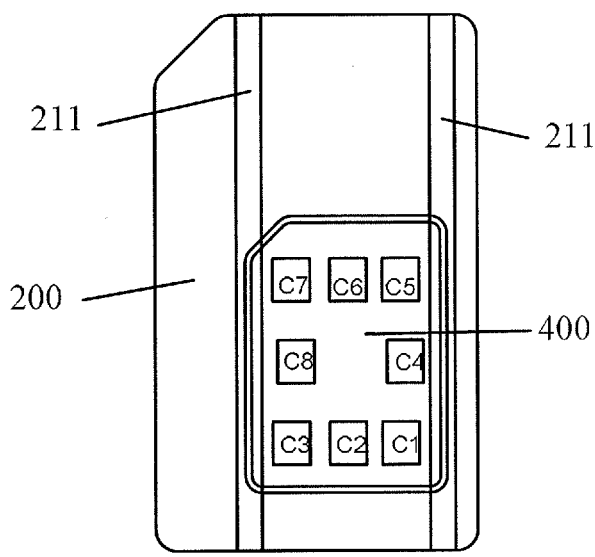
FIG. 4 is an assembly diagram that 4FF card and suitable chassis in the communication terminal compatible with the plurality of smart cards in the present invention.

Preferably, as shown in FIG. 3 and FIG. 4, the 3FF card 300 and the 4FF card 400 respectively arrange two chassis 200 which means the 3FF card 300 and the 4FF card 400 are not set up in the same chassis 200. Therefore, it assures to narrow down the chassis to improve useful space of the communication terminal so that it conforms to a development of thinner communication terminals.

Figure 2:
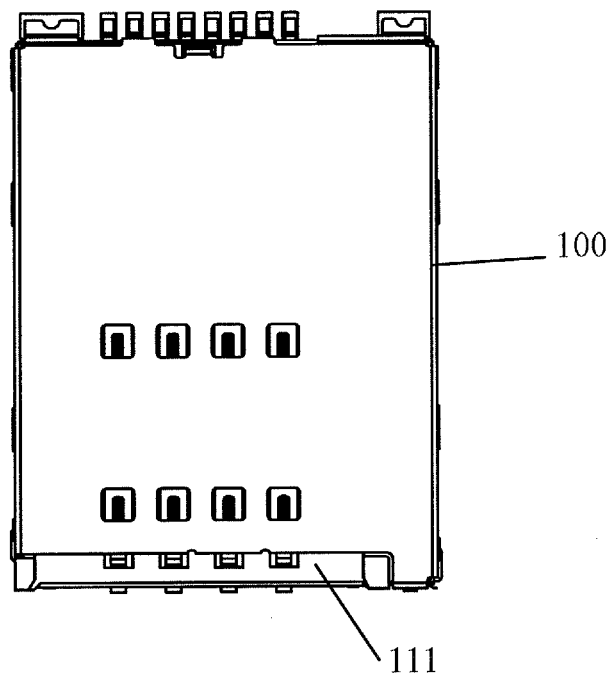
FIG. 2 is an assembly diagram that the main body and the shell on the socket in the communication terminal compatible with the plurality of smart cards in the present invention.
Figure 5:
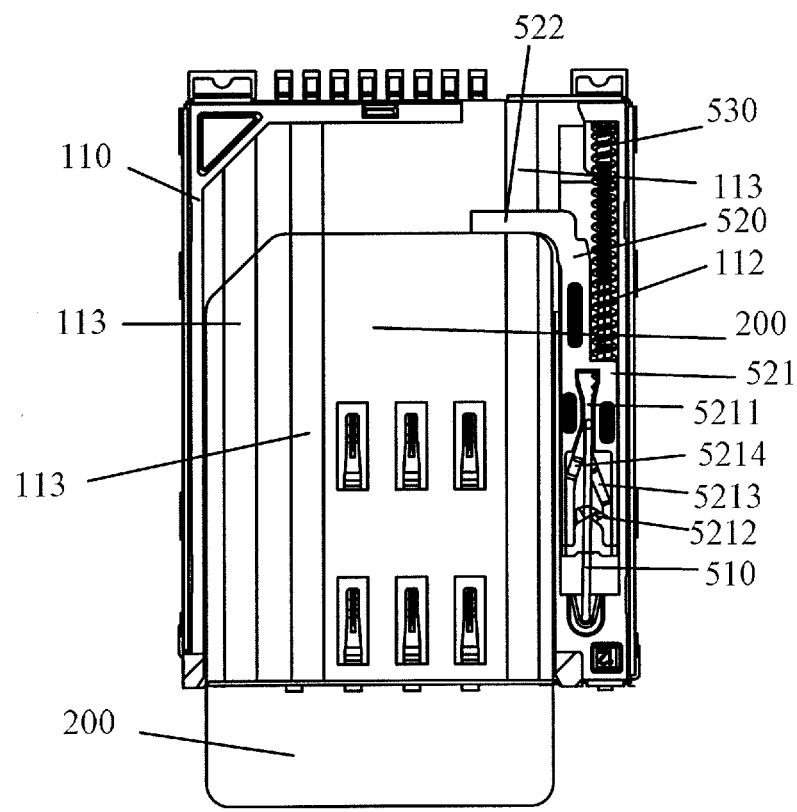
Figure 6:
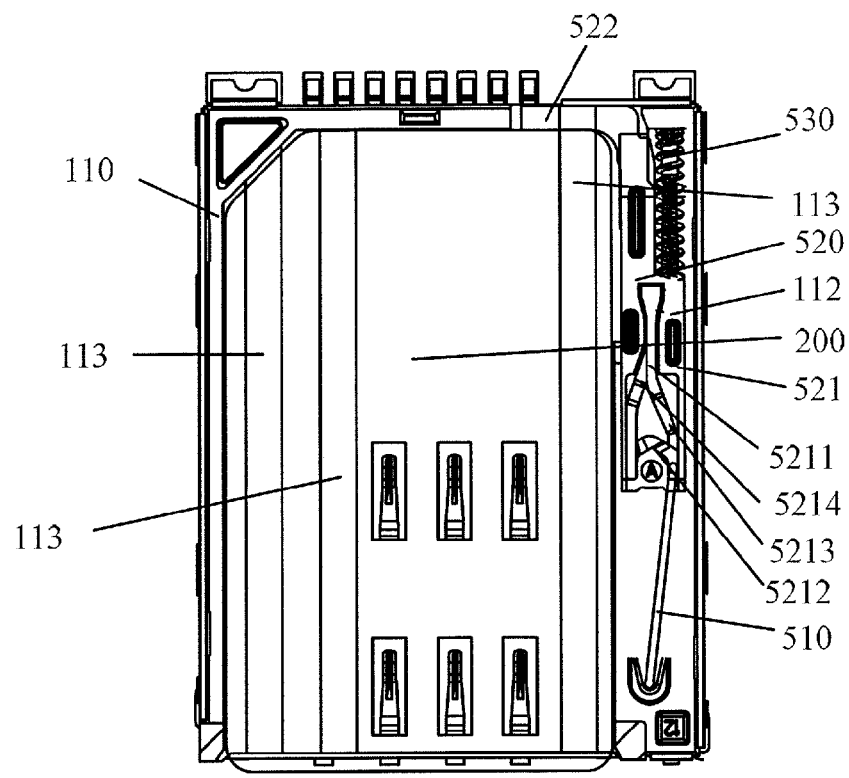
Figure 7:
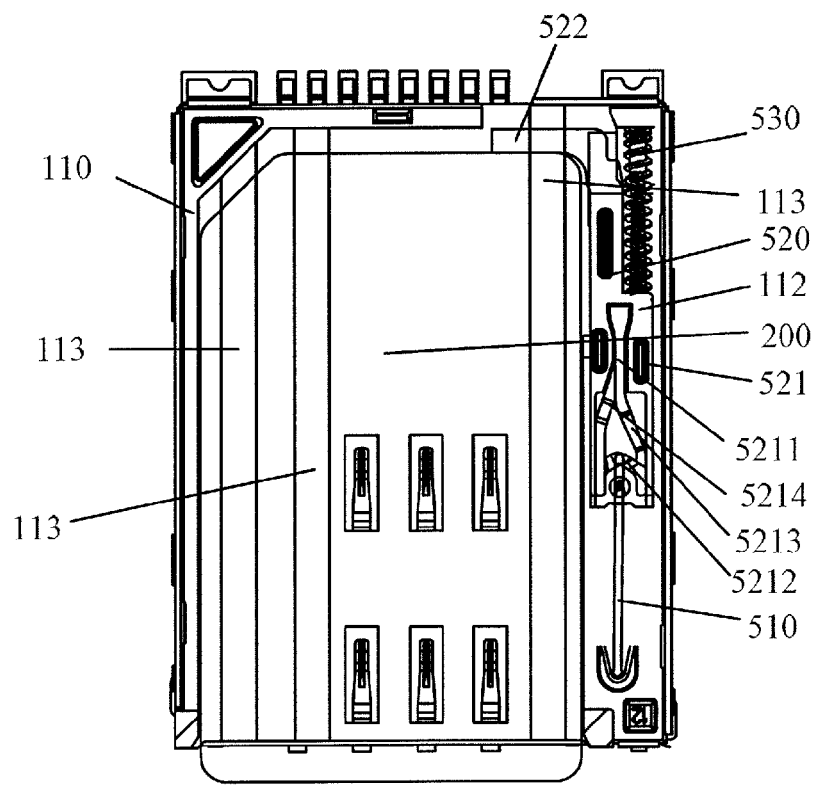
FIG. 7 is a schematic diagram that the chassis of the communication terminal compatible with the plurality of smart cards in the present invention locks on the socket.
Figure 8:
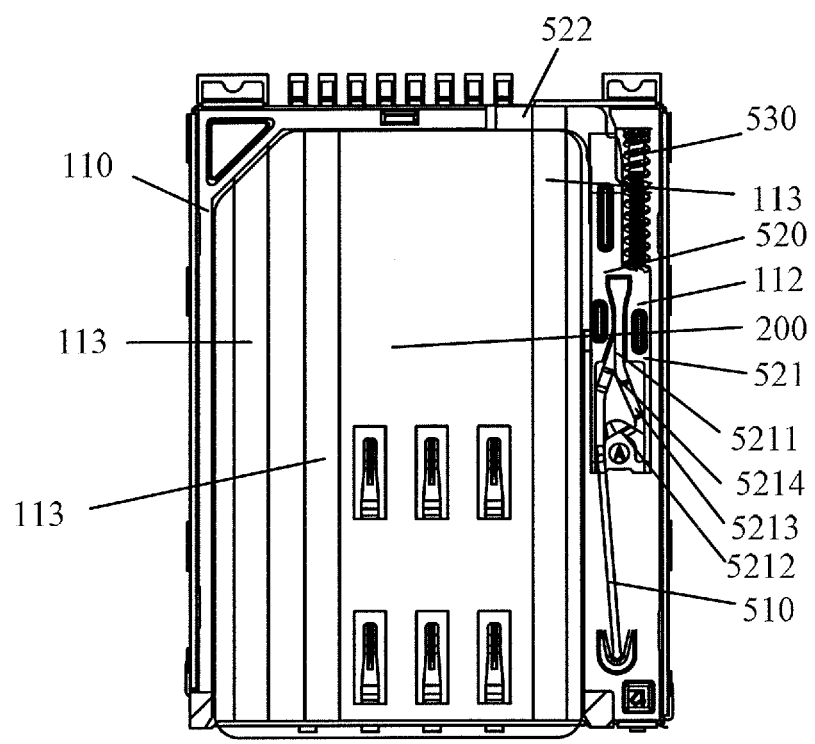
FIG. 8 is a schematic diagram that the chassis of the communication terminal compatible with the plurality of smart cards in the present invention in the process of being pushed off.

As FIG. 1 and FIG. 2 illustrate, the socket 100 comprises a main body 110 made of plastic. The main body 110 arranges a groove for inserting a 2FF card and the chassis 200. The surface where the groove of the main body 110 locates is covered by the shell 120 made of iron. The main body 110 arranges a transmission mechanism 112 for inserting or ejecting 2FF card or the chassis 200 (as FIG. 5 shows). When 2FF card or the chassis 200 is pushed off, insert 2FF card or the chassis 200 with hands, and the 2FF card or the chassis 200 is locked until the 2FF card or the chassis 200 arrives at the lock location. On the contrary, when 2FF card or the chassis 200 is locked, push 2FF card or the chassis 200 with hands and loosen, and then the 2FF card or the chassis 200 ejects (refer to FIG. 5 to FIG. 8).

It arranges a guide groove 113 in the main body 110 and a rail 211 on the chassis 200 for the chassis entering into or ejecting from the socket 100 accurately.

It also arranges a disk device for storing the chassis 200 in the communication terminal so that the chassis 200 is stored in the disk device if not used.

In hence, the present invention provides the chassis 200 for the communication terminal being compatible with the 3FF card 300 and the 4FF card 400 well, and without doubt, the communication terminal is also compatible with other smaller SIM cards that is also protected in the present invention.

Refer to any one of FIG. 5 to FIG. 8, the transmission mechanism comprises a locating bar 510, a supporting member 520 and a retaining spring 530. One side of the locating bar 510 is swingably connected with the first fixed part of the main body 110, and the other side of the locating bar 510 is connected with the supporting member 520. One side of the retaining spring 530 is connected with the second fixed part of the main body 110, and the other side of the retaining spring 530 is connected with a connecting member 521.

The supporting member 520 comprises the connecting member 521 and the hook 522 extending into the groove. A chute for the other side of the locating bar 510 sliding, and the chute comprises an intersection groove 5211 and a locating groove 5212 for locating the locating bar 510. A first sliding groove 5213 for guiding the other side of the locating bar 510 from the intersection groove 5211 to the locating groove 5212 and a second sliding groove 5214 for guiding the other side of the locating bar 510 from the locating groove 5212 to the intersection groove 5211 are set up between the intersection 5211 and the locating groove 5212. The junction between the first groove 5213 and the locating groove 5212 appears stair shape for preventing the other side of the locating bar 510 from going back, the junction between the locating groove 5212 and the second sliding groove 5214 appears stair shape for preventing the other side of the locating bar 510 from going back, and the junction between the second sliding groove 5214 and the intersection groove 5211 appears stair shape for preventing the other side of the locating bar 510 from going back. The locating groove 5212 is U- or V-shaped, and two walls of the valley of U-shape or V-shape of the locating groove 5212 are dislocated so that the locating groove 5212 guides the locating bar 510 to the direction of the second sliding groove 5214, not guiding to back. Besides that, the locating groove 5212 also appears step shape to prevent the locating bar 510 from going back.

Refer to FIG. 5 showing an original state diagram that the chassis does not insert into the communication terminal. At this moment, the other side of the locating bar 510 locates in the intersection groove to push the socket 200 (or a 2FF card), the socket 200 pushes the hook 522, and the connecting member 521 compresses the retaining spring 530. With the movement of the connecting member 521, the other side of the locating bar 510 enters into the first sliding groove 5213 from the intersection groove 5211 until the hook 522 touches the main body 110. At this moment, the other side of the locating bar 510 slides through a transition step of the first sliding groove 5213 and the locating groove 5212 into the locating groove 5212 (refer to FIG. 6). And then release the hand so that the connecting member 521 returns back under the elastic force from the retaining spring 530 until the other side of the locating bar 510 arrives against the valley wall of the locating groove 5212 (refer to FIG. 7). In hence the chassis 200 is locked in the groove. When it needs to pull the chassis 200 out, it pushes the chassis 200 until the hook 522 touches the main body 110. At this moment, the other side of the locating bar 510 slides through a transition step of the second sliding groove 5214 and the locating groove 5212 into the second sliding groove 521 (refer to FIG. 8). And then release the hand so that the connecting member 521 returns back under the elastic force from the retaining spring 530, and the other side of the locating bar 510 moves to the intersection groove 5211 along with the second sliding groove 5214. Therefore, it ejects the chassis 200 to back to the original state.

The present invention provides a communication terminal compatible with a plurality of smart cards that a mobile terminal is compatible with 3FF and/or 4FF card because of the arrangement of the correspondent chassis in the case that it only arranges 2FF card socket.

The present invention has been described with reference to certain preferred and alternative embodiments which are intended to be exemplary only and not limited to the full scope of the present invention as set forth in the appended claims.

What is claimed is:

1. A communication terminal compatible with a plurality of smart cards, comprising:
   a socket for inserting a standard smart card, the socket comprising a main body and a shell; and
   a chassis for making the socket fitting at least one of small and ultra-small types of smart cards, the small smart card and the ultra small smart card inserting into the socket through the chassis, the chassis comprising:
      a card slot for making the socket fitting the small smart card and the ultra small smart card;
   the main body comprising:
      a groove for inserting the standard smart card and the chassis, the shell being set up on a surface where the groove locates;
      a transmission mechanism for inserting or ejecting the standard smart card and the chassis; and
      a plurality of guide grooves for guiding the plurality of smart card and the chassis to insert or eject, the plurality of guide grooves comprising a first guide groove, a second guide groove, and a third guide groove;
   wherein a pitch between the first guide groove and the second guide groove fits the small smart card and a pitch between the first guide groove and the third guide groove fits the ultra small smart card.

2. The communication terminal compatible with a plurality of smart cards of claim 1, wherein the transmission mechanism comprises:
   a locating bar, one side of which is swingably connected with a first fixed part of the main body, and the other side is connected with a supporting member;
   the supporting member comprises:
      a connecting member for providing a sliding groove, the sliding groove sliding with the other side of the locating bar; and
      a hook for extending into the groove to testify if the standard smart card and the chassis insert, wherein a retaining spring is set up between the connecting member and a second fixed part of the main body.

3. The communication terminal compatible with a plurality of smart cards of claim 2, wherein the sliding groove comprises:
  an intersection groove, and
  a locating groove for locating the locating bar;
  a first sliding groove, set up between the intersection groove and the locating groove, for guiding the other side of the locating bar to the locating groove from the intersection groove, and
  a second sliding groove, set up between the intersection groove and the locating groove, for guiding the other side of the locating bar to the intersection groove from the locating groove.

4. The communication terminal compatible with a plurality of smart cards of claim 3, wherein shape of a junction between the first sliding groove and the locating groove appears stair to prevent the other side of the locating bar from going back; shape of a junction between the locating groove and the second sliding groove appears stair to prevent the other side of the locating bar from going back; shape of a junction between the second sliding groove and the intersection groove appears stair to prevent the other side of the locating bar from going back.

5. The communication terminal compatible with a plurality of smart cards of claim 1, wherein the locating groove appears U- or V-shape.

6. The communication terminal compatible with a plurality of smart cards of claim 1, wherein the main body is made of plastic, and the shell is made of iron.

7. A communication terminal compatible with a plurality of smart cards, comprising:
  a socket for inserting a standard smart card, the socket comprising:
    a plurality of guide grooves for guiding the plurality of smart card and the chassis to insert or eject, the plurality of guide grooves comprising a first guide groove, a second guide groove, and a third guide groove;
    wherein a pitch between the first guide groove and the second guide groove fits the small smart card and a pitch between the first guide groove and the third guide groove fits the ultra small smart card; and
  a chassis for making the socket fitting at least one of small and ultra-small types of smart cards,
    wherein the small smart card and the ultra small smart card insert into the socket through the chassis.

8. The communication terminal compatible with a plurality of smart cards of claim 7, wherein the chassis arranges a card slot for making the socket fitting the small smart card and the ultra small smart card.

9. The communication terminal compatible with a plurality of smart cards of claim 7, wherein the socket comprises a main body and a shell,
  the main body comprises:
    a groove for inserting the standard smart card and the chassis; and
    a transmission mechanism for inserting or ejecting the standard smart card and the chassis;
  wherein the shell is set up on a surface where the groove of the main body locates.

10. The communication terminal compatible with a plurality of smart cards of claim 9, wherein the transmission mechanism comprises:
  a locating bar, one side of which is swingably connected with a first fixed part of the main body, and the other side is connected with a supporting member;
  the supporting member comprises:
    a connecting member for providing a sliding groove, the sliding groove sliding with the other side of the locating bar; and
    a hook for extending into the groove to testify if the standard smart card and the chassis insert, wherein a retaining spring is set up between the connecting member and a second fixed part of the main body.

11. The communication terminal compatible with a plurality of smart cards of claim 10, wherein the sliding groove comprises:
  an intersection groove, and
  a locating groove for locating the locating bar;
  a first sliding groove, set up between the intersection groove and the locating groove, for guiding the other side of the locating bar to the locating groove from the intersection groove, and
  a second sliding groove, set up between the intersection groove and the locating groove, for guiding the other side of the locating bar to the intersection groove from the locating groove.

12. The communication terminal compatible with a plurality of smart cards of claim 11, wherein shape of a junction between the first sliding groove and the locating groove appears stair to prevent the other side of the locating bar from going back.

13. The communication terminal compatible with a plurality of smart cards of claim 11, wherein shape of a junction between the locating groove and the second sliding groove appears stair to prevent the other side of the locating bar from going back.

14. The communication terminal compatible with a plurality of smart cards of claim 11, wherein shape of a junction between the second sliding groove and the intersection groove appears stair to prevent the other side of the locating bar from going back.

15. The communication terminal compatible with a plurality of smart cards of claim 11, wherein the locating groove appears U- or V-shape.

16. The communication terminal compatible with a plurality of smart cards of claim 9, wherein the main body is made of plastic, and the shell is made of iron.

* * * * *